United States Patent [19]

Dulhunty

[11] 3,711,624
[45] Jan. 16, 1973

[54] CABLE VIBRATOR DAMPER WITH MOVEABLE ADDITIONAL WEIGHTS

[75] Inventor: Philip Wellesley Dulhunty, Sefton, New South Wales, Australia

[73] Assignee: Dulmison (Australia) Pty. Limited, Shefton, New South Wales, Australia

[22] Filed: Aug. 2, 1971

[21] Appl. No.: 168,371

[30] Foreign Application Priority Data

Aug. 7, 1970 Australia..........................PA2096/70

[52] U.S. Cl....................................................174/42
[51] Int. Cl..............................................H02g 7/14
[58] Field of Search.........................................174/42

[56] References Cited

UNITED STATES PATENTS

| 1,675,391 | 7/1928 | Stockbridge | 174/42 |
| 1,992,538 | 2/1935 | Monroe et al. | 174/42 |
| 2,005,882 | 6/1935 | Arnold | 174/42 UX |
| 3,052,747 | 9/1962 | Clark et al. | 174/42 |
| 3,432,610 | 3/1969 | Claren | 174/42 |

FOREIGN PATENTS OR APPLICATIONS

| 702,244 | 1/1931 | France | 174/42 |
| 554,712 | 7/1932 | Germany | 174/42 |
| 444,694 | 3/1936 | Great Britain | 174/42 |

Primary Examiner—Laramie E. Askin
Attorney—Stevens, Davis, Miller & Mosher

[57] ABSTRACT

A Stockbridge vibration damper for cables having at least one weight of elongated shape in combination with at least one additional weight adapted to be removably attached to the outer surface of said elongated weight at any selected region along the length of the major axis of each said elongated weight.

8 Claims, 17 Drawing Figures

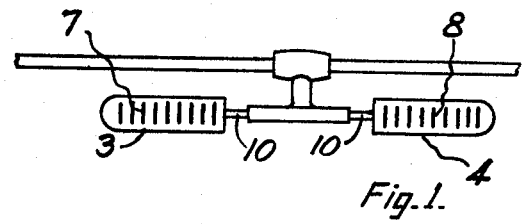 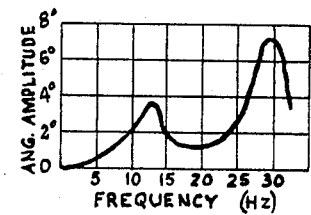
Fig. 1. / Fig. 1a
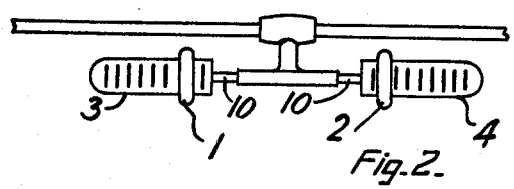 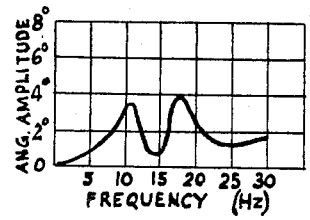
Fig. 2. / Fig. 2a
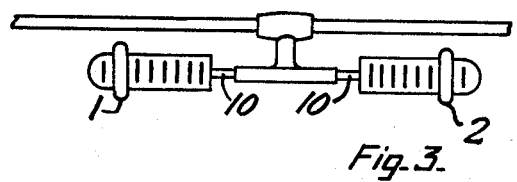 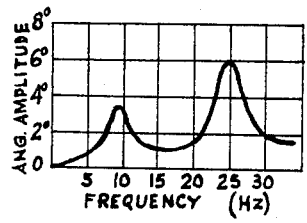
Fig. 3. / Fig. 3a
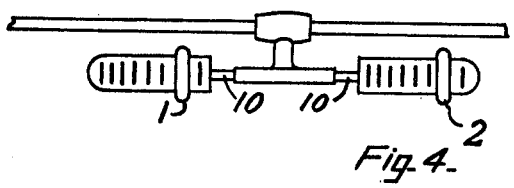 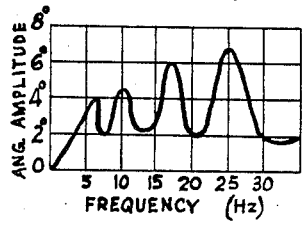
Fig. 4. / Fig. 4a
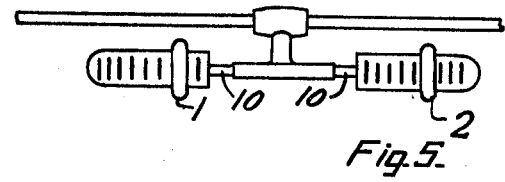 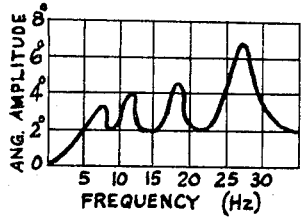
Fig. 5. / Fig. 5a
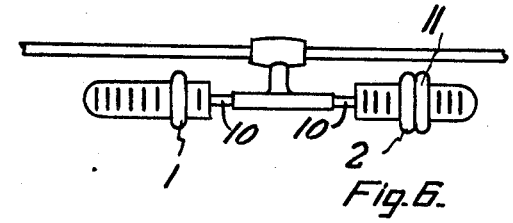 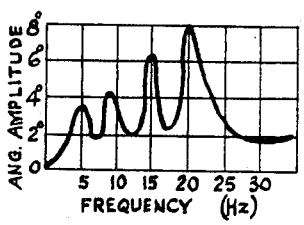
Fig. 6. / Fig. 6a

PATENTED JAN 16 1973 3,711,624

CABLE VIBRATOR DAMPER WITH MOVEABLE ADDITIONAL WEIGHTS

This invention relates to vibration dampers of the type which are suspended at linear intervals from overhead cables to reduce vibration generated therein mainly by external natural causes.

More particularly, the invention has been devised for use with vibration dampers intended to be secured to overhead multi-strand cables in transmission lines for electricity reticulation systems.

One of the most restrictive limitations in devices of the last-mentioned kind, known as Stockbridge Vibration Dampers, is their response to a relatively narrow band of vibration frequencies. For example, a typical frequency response curve peaks at 5Hz and at 15Hz for angular amplitudes of the order of 4 and 5 degrees respectively. A wider range of frequency response can be obtained by using two weights of varying proportions but only at the expense of sacrificing energy absorption, because only one weight, or part of one weight, is reactive to each frequency.

The problem exists because the transmission lines to which the dampers are applied, vibrate at many different frequencies depending on wind speeds, conductor tensions and the like. Thus, most vibration dampers have said two response peaks of 5Hz and 15Hz, leaving frequencies between and beyond relatively unprotected.

It has been found that in a standard Stockbridge Damper the messenger cable, which supports the weights, bends at a point relatively close to its center clamp at the lower frequencies. As the frequency of oscillation increases, the point of bending of the messenger cable increases in distance from the center clamp, and the point of rotation of each weight moves away from the center to the outer ends. This is especially so where the weights are in the form of a U-shaped solid of revolution in which the weight has a center of gravity near the base of the internal U-shaped root of said solid, but it is lying outside the material of the base itself, but it is known that if the center of gravity is moved outwards from the point of rotation (or in an outward direction from the center clamp) it will be responsive to a higher frequency.

Some Stockbridge Dampers have been made with the center of gravity close to the outward point of attachment so that their second resonance will respond to high frequencies (20Hz) more than to lower frequencies (10–15Hz). Such dampers suit conditions where higher wind velocities (6–10 M.P.H.) cause the most dangerous range of vibration frequencies. However, they are not the best dampers for vibration conditions caused by the lower wind speeds, say 2-5 m.p.h.

It is known that a normal weight as used in the prior art, comprising a hollow solid of revolution formed from a substantially U-shaped plane, wherein the center of gravity lies above the root of the depression therein, has a frequency curve which will peak, at say, 5 and 11 Hz whereas a pear-shaped weight of otherwise similar form but tapering inwardly towards its mouth will have its center of gravity just within the base portion of said solid, and have a frequency response curve which peaks at, say, 6 and 20Hz. Similarly, a pear-shaped weight which tapers outwardly towards said mouth will have its center of gravity lying in free space just within the mouth, and have a frequency response curve which peaks at, say, 3 and 9Hz. Thus there is an optimum position for the center of gravity of the weight to provide the most energy absorption for every frequency condition.

It is known that most aeolian vibration, which is caused by laminar air flow over a conductor, occurs at low wind speeds say from 2 to 5 m.p.h. and that wind speeds in excess of this tend to become turbulent in nature. Under such conditions the usual type of Stockbridge Damper with weights of the first-mentioned kind is the most satisfactory, both from the point of frequency response and reactive phase angle.

However in certain areas where terrain is very flat and treeless, winds can remain laminar and vibration-producing up to 8 – 15 m.p.h. In such areas, vibration frequencies of 15 to 30Hz can be experienced on transmission line conductors. On smaller conductors, such as grounding wires and the like, the frequencies can be much higher, say from 20 to 60Hz.

It is an object of this invention to provide a Stockbridge Damper with weights whose centers of gravity are variable in position, and/or whose masses are variable.

According to the invention, in one of its aspects, a Stockbridge Vibration Damper for cables comprises at least one weight of elongated shape in combination with at least one additional weight adapted to be attached removably to the outer surface of each said elongated weight at any selected region along the length of the major axis of each said elongated weight.

Certain embodiments of the invention will now be described herein with reference to the accompanying drawings in which:

FIG. 1 shows, in front elevation, a Stockbridge Vibration Damper provided with base weights only, FIG. 2 shows the apparatus of FIG. 1 with movable weights added to its base weights at a low frequency setting, FIG. 3 shows the apparatus of FIG. 2 at a high frequency setting, FIGS. 4 and 5 show the apparatus of FIG. 2 at differential high and low frequency settings, FIG. 6 shows the apparatus of FIG. 2 with a mass and displacement differential at a low frequency setting, FIG. 7 shows, in front elevation, a modified form of cylindrical weight for said damper, FIG. 8 shows, in end elevation, a view along the line 8—8 of FIG. 7.

Figure 7:
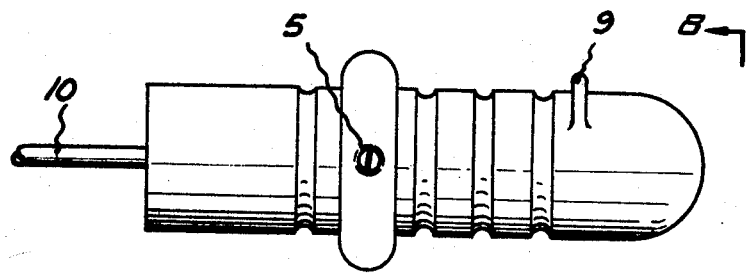

FIGS. 1a to 6a, to the right of FIGS. 1 to 6, show respectively frequency response curves for the apparatus illustrated in FIGS. 1 to 6.

Upon referring to the drawings it will be seen that said movable weights 1 and 2 are in the form of heavy rings which fit neatly about, but are slidable with respect to, the outer surfaces of respective right circular cylinders 3 and 4 and are each provided with a set screw or other locking means such as 5 or 6 so that they can be set at any position along the cylinders to alter the center of gravity of each cylinder-and-ring combination.

Variable dampers, in accordance with the invention, may be supplied with weights having rings initially fixed at the optimum position which would be marked on the cylinder. Dampers would in most cases be installed on lines in the optimum configuration, but after experience and information is gleaned from instrumentation and observation, the weights could be adjusted to give better response to the most dangerous frequencies experienced at each position. The cylinders could be marked with graduations 7 and 8 to indicate the various positions of the movable weights relative to their frequency response characteristics.

The two weights of a particular vibration damper may, if desired, be set at different positions as shown in FIGS. 4 and 5 to give a wider coverage of frequency response.

It has been found from tests leading to the invention that if the center of gravity of any such weight falls outwards of the point of contact of the messenger cable 10 with the weight, i.e., within the area in which the compressing or clamping of the weight to the messenger cable via a resilient member, the point of bending of the resilient member falls within the compressed area and fails relatively quickly from fatigue. Also, no further increase of resonant frequency occurs. For these reasons each cylindrical weight 3 or 4 may incorporate a stop such as 9 or a warning mark to prevent or advise against adjusting the variable ring so that the center of gravity of the total weight is beyond it.

Figure 8:
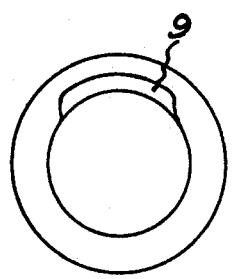
Figure 9:
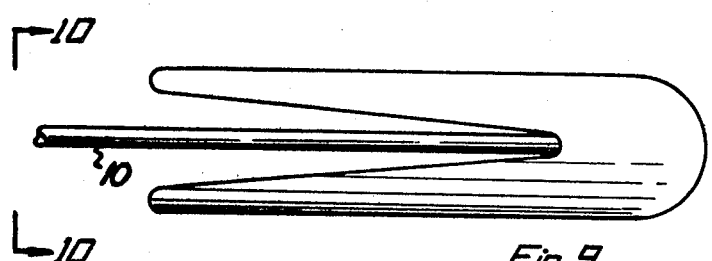
FIG. 9 shows a further modification of said weight for said damper.
Figure 10:
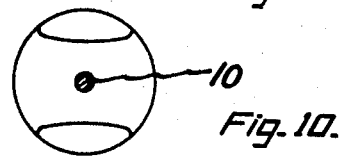
FIG. 10 shows, in end elevation, a view along the line 10—10 of FIG. 9.
Figure 11:
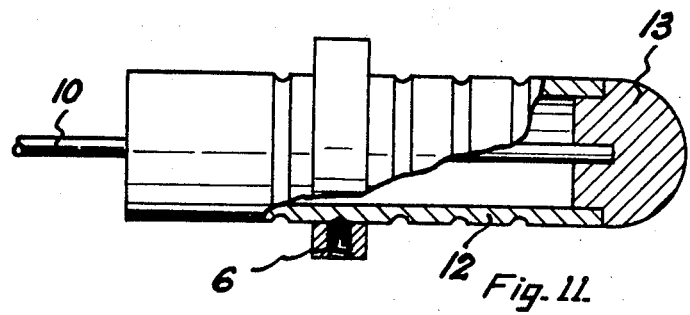
FIG. 11 shows, in front elevation and partly in section, a further modification of said weight for said damper.

The weights 3 and 4 may be of cylindrical cross-section and hollow as shown in FIGS. 7 and 8. This requires relatively expensive pattern equipment and moulding techniques. In a less costly modification of the invention shown in FIGS. 9 and 10 a satisfactory weight is made open-sided in the form of a clothes-pin so that no such moulding is required. Alternatively each said weight may be inexpensively fabricated from common steel or iron piping 12 of the required diameter and wall thickness, and then provided with an end plug 13 to take a resilient member fixed in position (e.g., screwed, rivetted, swaged, welded or the like) as shown in FIG. 11.

If desired, in a further modification of the invention, each said elongated weight may be of a standard size but nevertheless adapted to have one or more movable weights of the same or different sizes fixed thereto such as the weight 11 as shown in FIG. 6. For example, masses of 3, 4 and 5 pounds added to a 4-pound cylinder would provide 7, 8 and 9 pound combinations respectively.

I claim:

1. A Stockbridge vibration damper comprising an elongated resilient member engaged intermediate its ends by a clamp means adapted to engage a transmission line for securing the damper thereto, a pair of elongated weights one disposed at each end of said elongated resilient member, and at least one movable additional weight adjustably affixed to the outer surface of one of said elongated weights at any selected region along the length of the major axis thereof.

2. A Stockbridge vibration damper for cables as claimed in claim 1, wherein each said elongated weight is cylindrical in shape.

3. A Stockbridge vibration damper for cables as claimed in claim 1, wherein each said elongated weight is right cylindrical in shape.

4. A Stockbridge vibration damper for cables as claimed in claim 1, wherein said at least one movable weight is in the form of a ring which fits neatly about, but is slidable with respect to, the outer surface of said elongated weight, locking means on said movable weight whereby said ring is immobilized at any position along the elongated weight to thereby alter the center of gravity of each resulting weight-and-ring combination.

5. A Stockbridge vibration damper for cables as claimed in claim 4, wherein said locking means is a set screw.

6. A Stockbridge vibration damper for cables as claimed in claim 1, wherein a stop is provided at each end of each said elongated weight to prevent each associated moving weight from falling off its respective elongated weight.

7. A Stockbridge damper for cables as claimed in claim 1, wherein each said elongated weight is hollow.

8. A Stockbridge vibration damper for cables as claimed in claim 1, wherein each said elongated weight is open-sided in section in the form of a clothes pin.

* * * * *